(12) United States Patent
Lesky et al.

(10) Patent No.: US 12,162,108 B2
(45) Date of Patent: Dec. 10, 2024

(54) SETTING DEVICE

(71) Applicant: PROFIL Verbindungstechnik GmbH & Co. KG, Friedrichsdorf (DE)

(72) Inventors: Benjamin Lesky, Rosbach vor der Höhe (DE); Andreas Stumpf, Pohlheim (DE); Klaus Irmler, Pohlheim (DE); Andreas Lebeau, Friedrichsdorf (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 18/235,375

(22) Filed: Aug. 18, 2023

(65) Prior Publication Data
US 2024/0058907 A1 Feb. 22, 2024

(30) Foreign Application Priority Data
Aug. 22, 2022 (DE) .......................... 102022121173.8

(51) Int. Cl.
*B23P 19/06* (2006.01)
*F16B 37/06* (2006.01)

(52) U.S. Cl.
CPC .......... *B23P 19/062* (2013.01); *F16B 37/068* (2013.01)

(58) Field of Classification Search
CPC .......... B21J 15/025; B21J 15/36; B21J 15/02; F16B 37/068; B23P 19/062
See application file for complete search history.

(56) References Cited

U.S. PATENT DOCUMENTS

| 4,164,072 A | 8/1979 | Shinjo | |
|---|---|---|---|
| 7,555,833 B2 * | 7/2009 | Wang | B21J 15/36 29/798 |
| 8,316,524 B1 * | 11/2012 | LeMieux | B21J 15/28 29/524.1 |

(Continued)

FOREIGN PATENT DOCUMENTS

| DE | 102017200087 A1 | 7/2018 |
|---|---|---|
| DE | 102018113870 A1 | 12/2019 |

OTHER PUBLICATIONS

EP 2186579A2, Dorsch May 2010.*

(Continued)

*Primary Examiner* — Edward T Tolan
(74) *Attorney, Agent, or Firm* — Gregory J. Gore, Esq.

(57) ABSTRACT

The present invention relates to a setting device for fastening a functional element to a workpiece, in particular to a sheet metal component. The setting device comprises a die for receiving and supporting the workpiece and a setting head having a setting die which cooperates with the functional element and by which the functional element can be fastened to the workpiece in an axial setting movement. The setting device further comprises a checking device for determining the quality of a connection of the functional element to the workpiece, wherein the checking device has a sensor having a first contact section, which can be electrically conductively contacted with the functional element, and having a second contact section that can be electrically conductively contacted with the workpiece. The present invention furthermore relates to a corresponding method of fastening a functional element to a workpiece.

23 Claims, 3 Drawing Sheets

(56) References Cited

U.S. PATENT DOCUMENTS

Figure 1:
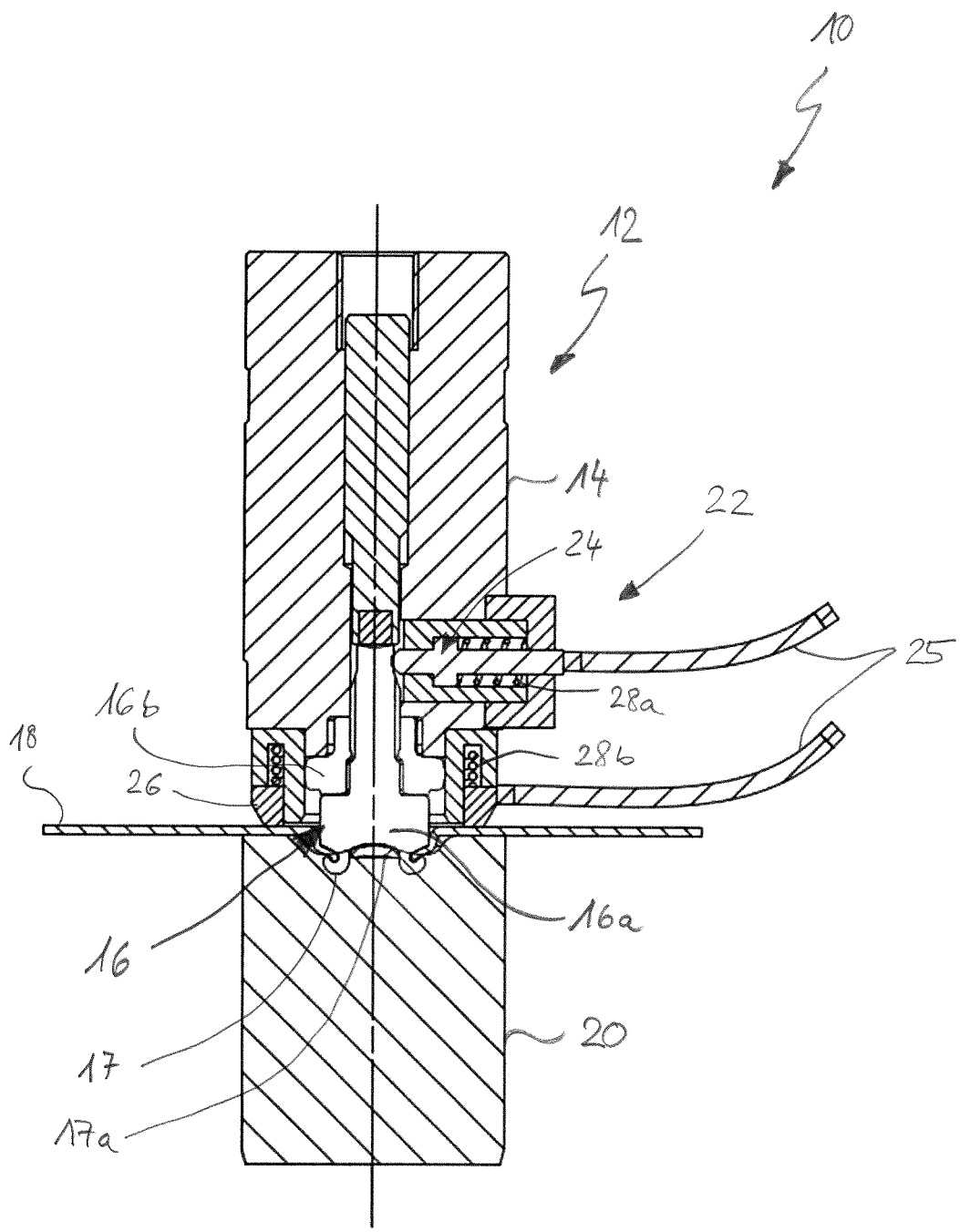

| | | | | |
|---|---|---|---|---|
| 9,027,220 B2* | 5/2015 | Schlafhauser | ......... | B21J 15/025 |
| | | | | 702/158 |
| 10,843,253 B2* | 11/2020 | Huff | ....................... | B21J 15/025 |
| 2013/0081242 A1* | 4/2013 | LeMieux | ............... | B21J 15/105 |
| | | | | 29/243.53 |

OTHER PUBLICATIONS

CN 108637157A, Chen Oct. 2018.*
DE 102012221532A1, Michelbach et al. Jun. 2013.*
EP 3102349B1, Strassburger Nov. 2017.*
DE 102016207697A1, Woelke et al. Nov. 2017.*

* cited by examiner

SETTING DEVICE

The invention relates to a setting device for fastening a functional element to a workpiece, in particular to a sheet metal component.

Functional elements are known in a wide variety of designs and are used in many areas, e.g. in automotive engineering. They are, for example, fastened to sheet metal components to serve as fastening points for further components. Exemplary functional elements are nut elements that are attached in a self-punching manner to workpieces. For example, they can be elements that have a rivet section that is reshaped during the fastening process so that an undercut is created that fixes the element to the workpiece. However, there are also elements that are only held at the workpiece by pressing forces.

Such a nut element can, for example, have a bore having an internal thread that enables a component to be screwed to the sheet metal part. However, elements having smooth bores or differently designed functional regions are also conceivable.

In addition to nut-shaped functional elements, bolt elements are also used that have a shaft that can be provided with a functional section, for example, with an external thread.

In addition to self-punching elements, elements that are inserted into a prefabricated opening of the workpiece are also known.

The above statements illustrate that a large number of functional elements are known that can be fastenable to a workpiece in a wide variety of ways and that perform a wide variety of functions.

The process of fastening a functional element to a workpiece is also called "setting". Here, a suitable setting device is used. It usually has a die that is provided to receive and support the workpiece during the setting process. The setting device further has a setting head that comprises an axially movable setting die that cooperates with the functional element. With the setting die, the functional element can be fastened to the workpiece with an axial setting movement.

During a setting process of a self-punching functional element, the setting die presses the element against a workpiece that is not pre-punched at the corresponding position. Due to the setting force applied in this process, a section of the element is pressed into the workpiece, wherein it punches a slug out of the workpiece. The setting process can provide that the element is sectionally reshaped in order to fix it to the workpiece.

Corresponding setting devices are generally known. The same applies to a setting device for press-in elements and for non-self-punching elements.

The requirements for the quality of the connection of the functional element to the workpiece are very high in many cases. It has so far been subject to random checks. A visual inspection of the connection is quite easy to perform, but can only provide limited information regarding certain properties of the connection. A random check of individual connections in the laboratory is time-consuming and expensive.

It is an object of the present invention to remedy this point and to enable an improved and cost-effective quality assurance.

The present invention is based on the idea of providing the quality of the connection in the and by the setting device. In accordance with the invention, the setting device therefore has a checking device by which the quality of the connection of the functional element to the workpiece can be determined. The checking device has a sensor unit that comprises a first and a second contact section. The first contact section can be electrically conductively contacted with the functional element, while the second contact section can be electrically conductively contacted with the workpiece. The first contact section is in particular arranged at the setting head.

By means of the sensor unit, which for example comprises a control or measurement unit or is associated with a control or measurement unit, it is possible—provided that the functional element and the workpiece have a certain electrical conductivity—to draw a conclusion by means of an electrical measurement on how good the connection of the functional element to the workpiece is. For example, a resistance value above a predetermined threshold value can indicate an improperly implemented connection. By determining the quality of the connection in and by means of the setting device, it is possible—if desired—to check each connection that is created with regard to its quality. The determined data can be stored for documentation purposes. It is also possible for a control unit associated with the checking device and/or the setting device to also output a warning signal in addition to performing the quality check and optional documentation of the results determined so that a workpiece with a faulty connection can be sorted out immediately. The control unit of the setting device can comprise the control or measurement unit associated with the sensor unit.

Further embodiments of the invention are set forth in the claims, in the description and in the enclosed drawings.

In accordance with an advantageous embodiment, the second contact section is arranged at the setting head. Provision can also be made that the second contact section is arranged at the die.

By using the components that are present anyway in a setting device, the checking device can be implemented in a simple manner.

To be able to provide comparable results of the check, provision can be made that the first and/or the second contact section can be pressed against the workpiece with a predetermined force. Reproducible and comparable measurement data can be determined by a well-defined force application.

A first preloading device is in particular provided with a preloading element which is supported at the setting head section and by which the first contact section can be pressed against the functional element. Alternatively or additionally, a second preloading device can be provided with a preloading element which is supported at the setting head or the die and by which the second contact section can be pressed against the workpiece.

A suitable preloading element for the first and/or second preloading device is, for example, a spring element that is preloaded in a well-defined manner. However, instead of providing a preloading device with a preloading element, it is generally also conceivable to provide an electrical and/or pneumatic and/or hydraulic force application apparatus by which the first and/or the second contact section can be pressed against the functional element or against the workpiece. A force application can, for example, also take place by the setting head itself, in particular if the setting head can be operated in a force-controlled manner. A force application by the setting die is also conceivable.

A contacting of the functional element can, for example, take place in a radial direction, i.e. the first contact section cooperates with a radial surface of the functional element. However, it is also conceivable that the first contact section can be contacted with the functional element in the direction of the setting movement. In this case, its contacting takes place between the first contact section and the functional element in an axial direction. It is generally also conceivable that a surface of the setting die provided for applying the setting force (sectionally) acts as the first contact section.

The second contact section can have an annular contact surface that can be brought into contact with the workpiece. The contact surface preferably surrounds an axis of the setting movement. In other words: The second contact section can be designed such that, when in contact with the workpiece, it surrounds a region to which the functional element is being fastened or is fastened.

It should be noted that two or more first contact sections and/or two or more second contact sections can be provided to make the quality determination even more meaningful. For example, by energizing different combinations of first and second contact sections, it is possible to gain information about a spatial design of the connection.

The die can have a reshaping section for reshaping a section of the functional element. The setting device can further be configured and adapted to fasten a self-punching functional element. For example, it is provided for fastening a self-punching rivet element.

As initially described, the functional element can be a nut element or a bolt element. The element can have a functional section that is, for example, provided with a thread.

The present invention further relates to a method of fastening a functional element to a workpiece, in particular to a sheet metal component. In this respect, the functional element is inserted into the workpiece and fixed thereto by means of a setting device that is preferably designed in accordance with any one of the embodiments described above. The setting device has a checking device for determining the quality of a connection of the functional element to the workpiece. After the fixing of the functional element to the workpiece, an electrical parameter, which is a measure of a quality of the connection of the functional element to the workpiece, is determined by means of this checking device. For this purpose, the checking device has a sensor unit having a first contact section and having a second contact section. The first contact section is brought into electrically conductive contact with the functional element, while the second contact section is brought into electrically conductive contact with the workpiece.

In accordance with one embodiment of the method, the first contact section is electrically conductively contacted with the functional element before the functional element is inserted into the workpiece, in particular before a setting head of the setting device has been brought into mechanical contact with the workpiece. Additionally or alternatively, provision can be made that the second contact section is electrically conductively contacted with the workpiece before the functional element is inserted into the workpiece, in particular before a setting head of the setting device has been brought into mechanical contact with the workpiece or in that the setting head of the setting device is brought into mechanical contact with the workpiece. In the latter case, the electrical contacting of the second contact section is therefore generated by a movement of the setting head.

The electrical parameter that is determined in accordance with the invention is preferably an electrical resistance that is in particular determined by a current measurement and/or a voltage measurement.

In accordance with a further embodiment, during the determination of the electrical parameter, the functional element is acted on by a predetermined force that is in particular smaller than a setting force that is applied for inserting and fixing the functional element. The same applies to the workpiece. Additionally or alternatively, during the determination of the electrical parameter, the workpiece can be acted on by a predetermined force that is in particular smaller than a setting force that is applied for inserting and fixing the functional element.

The electrical parameter is in particular determined when a load on the connection between the functional element and the workpiece is smaller than the forces acting between the functional element and the workpiece during the insertion and/or fixing of the functional element.

Due to the measures described above, the check of the connection quality is prevented from providing a biased result. It is more realistic if the forces acting on the components of the connection or on the connection are within the range of the loads that typically occur or the forces that typically have an effect. For example, the predetermined force or the load is less than 500 N, less than 250 N, or approximately equal to or less than 100 N.

In accordance with one embodiment of the method, a section of the functional element is reshaped to fix the functional element.

Figure 2:
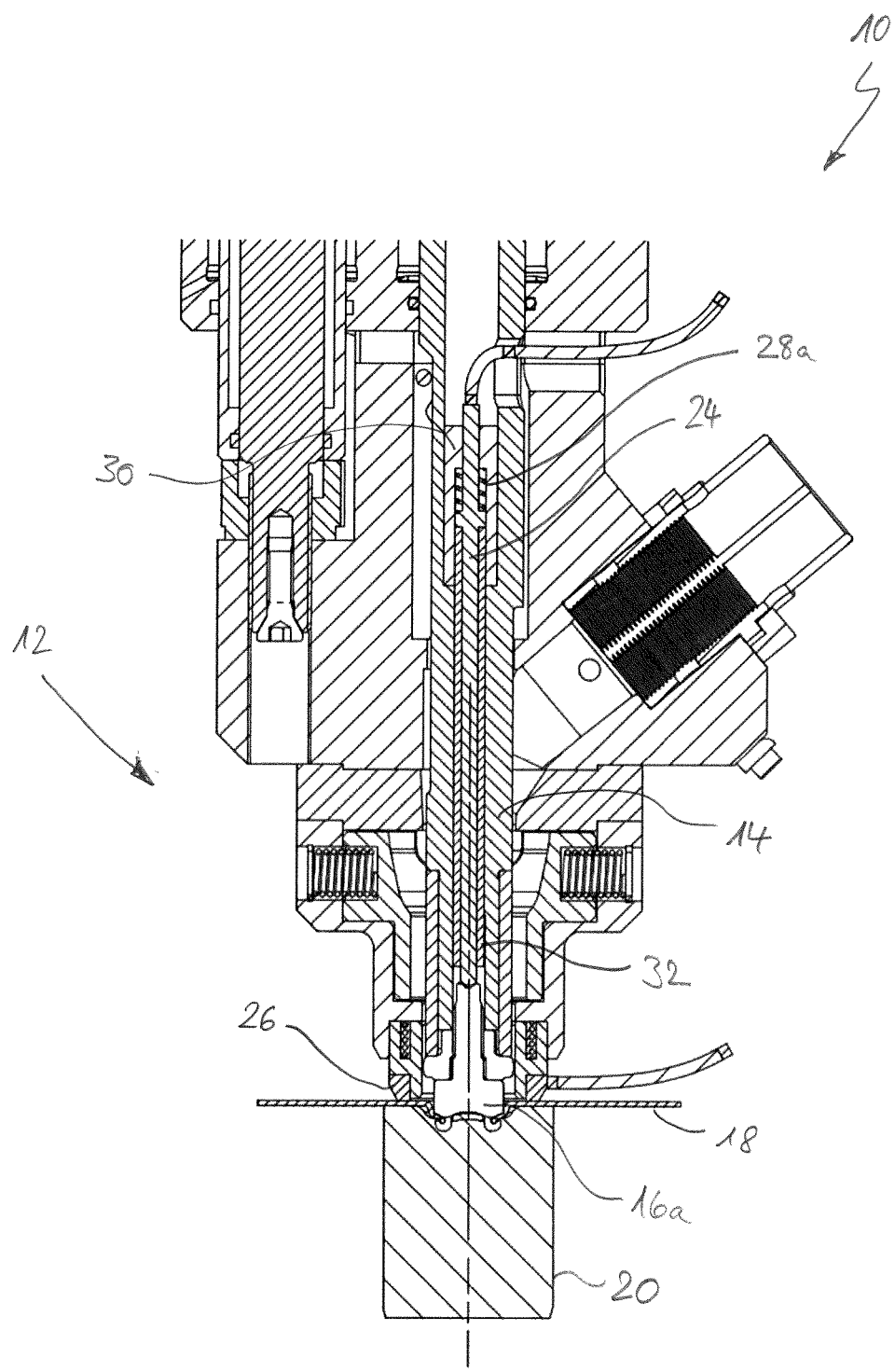
Figure 3:
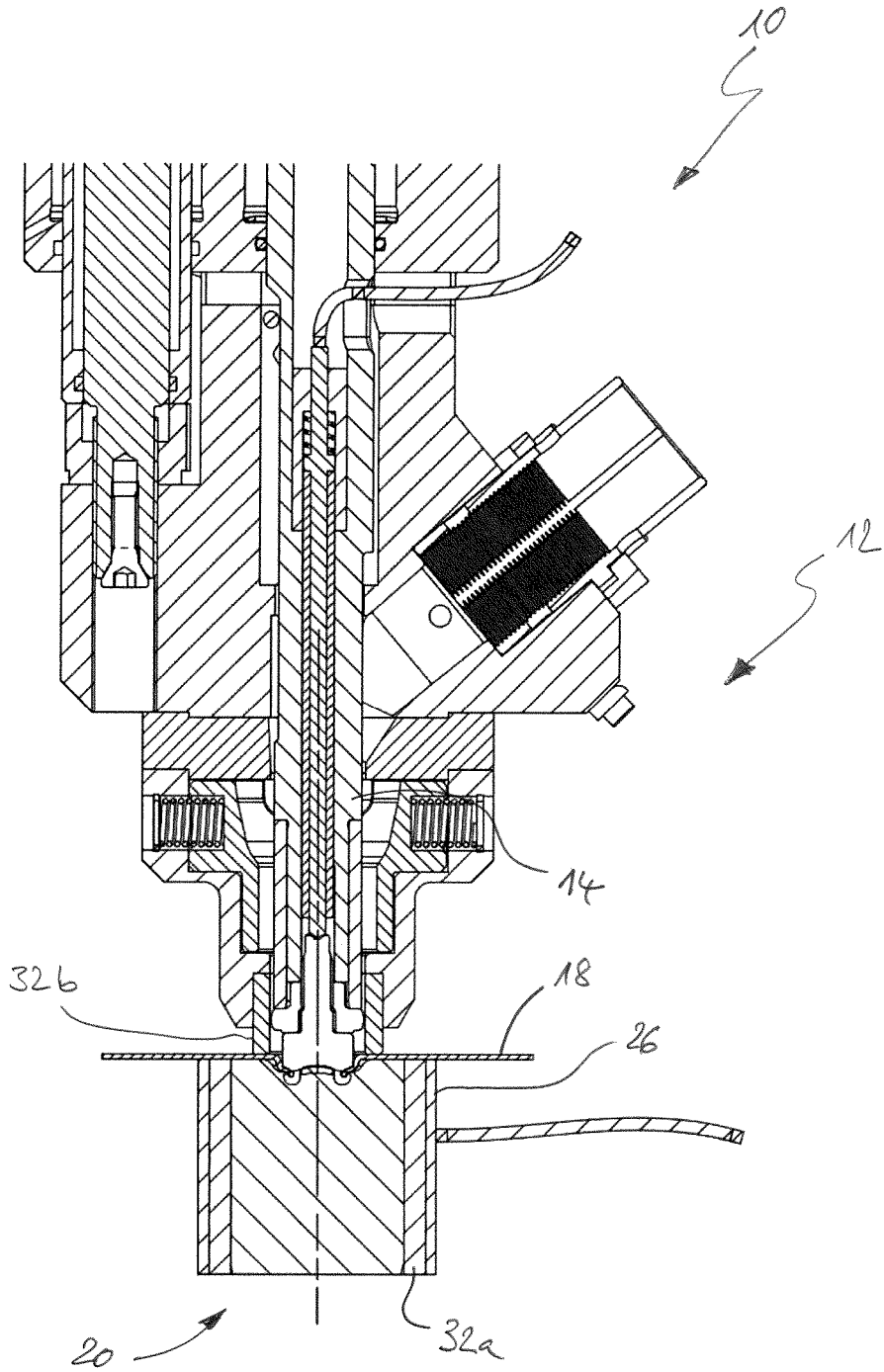

The present invention will be explained in the following purely by way of example with reference to advantageous embodiments and to the enclosed drawings. There are shown:

FIG. 1 a first embodiment of the setting device in accordance with the invention;

FIG. 2 a second embodiment of the setting device in accordance with the invention; and FIG. 3 a third embodiment of the setting device in accordance with the invention.

FIG. 1 shows a setting device 10 having a setting head 12 that comprises a setting die 14. With the setting die 14, a functional element 16 was fastened to a sheet metal component 18 that lies on a die 20. In the embodiment shown, the functional element 16 comprises a bolt element 16a onto which a nut element 16b is screwed.

The corresponding setting process is briefly explained below:

Together, the elements 16a, 16b are first pressed against the sheet metal component 18 by the setting die 14 engaging at an annular surface of the nut element 16b facing away from the sheet metal component 18. A rivet section 17 of the bolt element 16a in this respect projects through the sheet metal component 18, wherein it cuts out a slug 17a. In the further course of the setting movement, the rivet section 17a is bent over outwardly by a corresponding shape of the die 20 so that bent-over sections of the rivet section 17 engage behind the sheet-metal component 18. The functional element 16 is now secured to the sheet metal component 18.

The functional element 16 can serve as a contact point for a ground connection, for example. Such a ground connection can be held at the bolt element 16a by means of the nut element 16b. In this application, it is particularly important that a reliable electrically conductive connection is established between the functional element 16 and the workpiece 18 that are made of an electrically conductive material, in particular metal.

To check the quality of the connection between said components 16, 18 directly "in-line", a checking device having a sensor unit 22 is provided. In addition to the sensor unit 22, the checking device comprises a control or measurement unit (not shown) that can also be integrated into a control unit of the setting device 10 (likewise not shown). The sensor unit 22 comprises an element contact 24 and a workpiece contact 26 that are connected to the control or measurement unit via corresponding cables 25. The contacts 24, 26 are pressed against the functional element 16 or against the sheet metal component 18 by springs 28a, 28b. The contacts 24, 26 are electrically insulated from the setting head 12 in this respect. The same applies to the functional element 16 with respect to the setting die 14. Similarly, the sheet metal component 18 can be electrically insulated from the die 20. A suitable electrical insulation can be achieved by an appropriate material selection of the components involved and/or a coating of the setting die 14 or the die 20. It is also possible to provide electrically insulating sleeves or other components between the setting head 14 and the die 20, on the one hand, and the functional element 16 and/or the sheet metal component 18, on the other hand. The setting head 14 and/or the die 20 can also be (sectionally) produced from an insulating material.

The contacts 24, 26 are pressed against the functional element 16 and the sheet metal component 18, respectively, with a well-defined force by the springs 28a and 28b, which are each preloaded, to establish a reproducible contacting.

After the setting movement has been completed, the setting die 14 is relieved so that considerably fewer forces now act on the functional element 16 and the sheet metal component 18 than during the setting process itself in order to realistically determine a quality of the connection between the functional element 16 and the sheet metal component 18. In this respect, forces of less than 500 newtons, preferably less than 250 newtons, in particular forces of approximately 100 newtons or less, preferably act on or between said components.

To determine the connection quality, an energizing of the contacts 24, 26 takes place so that a current flows between the functional element 16 and the sheet metal component 18, which in turn makes it possible to determine the electrical resistance of the connection. This parameter is a measure of the quality of the connection between the functional element 16 and the sheet metal component 18.

In the present embodiment, an electrical resistance that is as low as possible is desired since the functional element 16 is intended to serve as a ground connection for a component, for example a component of a motor vehicle.

In the embodiment in accordance with FIG. 1, the element contact 24 is pressed in a radial direction against a shaft of the functional element 16.

In the embodiment of the setting device 10 in accordance with FIG. 2, the element contact 24 is a vertically arranged pin that is pressed in an axial direction against a shaft-side end of the bolt element 16a. The pressing force required for this purpose is provided by the spring 28a that acts in a perpendicular manner and that is supported at an end element 30 that is fixedly connected to the setting die 14. An insulating sleeve 32 is provided between the setting die 14 and the element contact 24.

As in the embodiment in accordance with FIG. 1, the workpiece contact 26 is associated with the setting head 12. It has a basic annular shape so that a contact surface between the workpiece contact 26 and the sheet metal component 18 surrounds the functional element 16 or the region of the sheet metal component 18 to which the functional element 16 is fastened. The workpiece contact 26 is again electrically insulated from the remaining components of the setting head 12 and is pressed against the sheet metal component by the spring 28b.

The check of the quality of the connection between the element 16 and the component 18 takes place as described above.

The further components of the setting head 10, in particular the mode of operation of the setting die 14 and details of a supply of the functional elements 16, are sufficiently known and will therefore not be explained in more detail here.

The embodiment of the setting device 10 in accordance with FIG. 3 differs from the setting device 10 in accordance with FIG. 2 in that the workpiece contact 26 is not associated with the setting head 12, but with the die 20. In this case, the contact 26 is a ring that—insulated by a sleeve 32a—surrounds the die 20. Thus, as in the embodiments in accordance with FIGS. 1 and 2, the workpiece contact 26 is in contact with the sheet metal component 18 via an annular contact surface.

After the actual setting process, the contacts 24 and 26 are again energized or a voltage is applied and the electrical resistance is determined in an analogous manner as described above. In the embodiment in accordance with FIG. 3, a force-controlled setting head 12 can be used. This means that the setting head 12 is pressed against the sheet metal component 18 with a precisely defined force so that it performs a kind of hold-down function after the setting process. In this respect, a sleeve 32b of the setting head 12 surrounding the element 16 is in annular contact with the sheet metal component 18. The sleeve 32b can be a ceramic component.

Similarly, the setting die 14 can be subjected to a predetermined force that is significantly smaller than the force required for setting the functional element 16 in order to provide reproducible measurement conditions. The same applies to the embodiment in accordance with FIG. 2.

It can be seen from the above statements that the checking device with the contact 24, 26 can be easily integrated into known setting devices. The element contact 24, together with a further contact, not shown, which can be contacted with the element 16, can, with a suitable control, also be used as a sensor by which it can be checked whether the setting device is correctly equipped with a functional element 16.

The quality assurance in accordance with the invention makes it possible to recognize faulty setting processes in a simple manner. Thus, not only can an individual inferior connection between a functional element 16 and the sheet metal component 18 be recognized, but wear of the setting device, among other things, can also be recognized. The data determined by the checking device can be stored for documentation purposes.

REFERENCE NUMERAL LIST 10 setting device
12 setting head
14 setting die
16 functional element
16a bolt element
16b nut element
17 rivet section
17a slug
18 sheet metal component
20 die
22 sensor unit
24 element contact
25 cable
26 workpiece contact
28a, 28b spring
30 end element
32, 32a, 32b sleeve

The invention claimed is:

1. A setting device for fastening a functional element to a workpiece, comprising:
    a die for receiving and supporting the workpiece,
    a setting head having a setting die which cooperates with the functional element and by which the functional element is fastened to the workpiece in an axial setting movement,
wherein the setting device comprises a checking device for determining the quality of a connection of the functional element to the workpiece, wherein the checking device has a sensor unit having a first contact section, electrically insulated from the setting die which is electrically conductively contacted with the functional element, and having a second contact section electrically insulated from the die that is electrically conductively contacted with the workpiece such that the electrical conductivity between the functional element and the workpiece can be directly measured by the checking device.

2. The setting device in accordance with claim 1, wherein the workpiece is a sheet metal component.

3. The setting device in accordance with claim 1, wherein the second contact section is arranged at the setting head.

4. The setting device in accordance with claim 1, wherein the second contact section is arranged at the die.

5. The setting device in accordance with claim 1, wherein the first contact section can be pressed against the functional element with a predetermined force and/or wherein the second contact section can be pressed against the workpiece with a predetermined force.

6. The setting device in accordance with claim 1, wherein a first preloading device is provided with a preloading element which is supported at the setting head and by which the first contact section can be pressed against the functional element.

7. The setting device in accordance with claim 1, wherein a second preloading device is provided with a preloading element which is supported at the setting head or the die and by which the second contact section can be pressed against the workpiece.

8. The setting device in accordance with claim 1, wherein the first contact section can be contacted with the functional element in the direction of the setting movement.

9. The setting device in accordance with claim 1, wherein the second contact section has an annular contact surface that is in direct contact with the workpiece.

10. The setting device in accordance with claim 9, wherein the contact surface surrounds an axis of the setting movement.

11. The setting device in accordance with claim 1, wherein the die has a reshaping section for reshaping a section of the functional element.

12. The setting device in accordance with claim 1, wherein the setting device is configured and adapted to fasten a self-punching functional element.

13. A method of fastening a functional element to a workpiece, comprising:
    providing the setting device of claim 1;
    wherein the functional element is inserted into the workpiece and fixed thereto by means of the setting device,
    wherein the setting device comprises a checking device for determining the quality of a connection of the functional element to the workpiece, and
    wherein, after the fixing of the functional element to the workpiece, an electrical parameter, which is a measure of a quality of the connection of the functional element to the workpiece, is determined by means of the checking device that comprises a sensor unit having a first contact section, which is electrically conductively brought into contact with the functional element, and having a second contact section that is electrically conductively brought into contact with the workpiece.

14. The method in accordance with claim 13, wherein the workpiece is a sheet metal component.

15. The method in accordance with claim 13, wherein the setting device further comprises a die for receiving and supporting the workpiece, a setting head having a setting die which cooperates with the functional element and by which the functional element can be fastened to the workpiece in an axial setting movement.

16. The method in accordance with claim 13, wherein the first contact section is electrically conductively contacted with the functional element before the functional element is inserted into the workpiece, and/or wherein the second contact section is electrically conductively contacted with the workpiece before the functional element is inserted into the workpiece or wherein the setting head of the setting device is brought into mechanical contact with the workpiece.

17. The method in accordance with claim 16, wherein the first contact section and/or the second contact section is electrically conductively contacted before a setting head of the setting device has been brought into mechanical contact with the workpiece.

18. The method in accordance with claim 13, wherein the electrical parameter is an electrical resistance that is in particular determined by a current measurement and/or a voltage measurement.

19. The method in accordance with claim 13, wherein, during the determination of the electrical parameter, the functional element is acted on by a predetermined force and/or wherein, during the determination of the electrical parameter, the workpiece is acted on by a predetermined force.

20. The method in accordance with claim 19, wherein the predetermined force is smaller than a setting force that is applied for inserting and fixing the functional element.

21. The method in accordance with claim 19, wherein the electrical parameter is determined when a load on the connection between the functional element and the workpiece is smaller than the forces acting between the functional element and the workpiece during the insertion and/or fixing of the functional element.

22. The method in accordance with claim 19, wherein the predetermined force or the load is less than 500 N, less than 250 N, or approximately equal to or less than 100 N.

23. The method in accordance with claim 13, wherein a section of the functional element is reshaped to fix the functional element.

* * * * *